United States Patent [19]

Welch et al.

[11] 3,865,981

[45] Feb. 11, 1975

[54] CLOCK SIGNAL ASSURANCE IN DIGITAL DATA COMMUNICATION SYSTEMS

[75] Inventors: James P. Welch, Glendora; Stephen R. Siegel, Los Angeles, both of Calif.

[73] Assignee: Odetics, Inc., Anaheim, Calif.

[22] Filed: July 16, 1973

[21] Appl. No.: 379,304

[52] U.S. Cl. ......... 178/69.5, 178/69.5 DC, 307/208, 328/63, 328/72, 340/347 DD

[51] Int. Cl. ............................................... H04l 7/00

[58] Field of Search ............... 178/69.5 R, 69.5 DC; 307/208, 269; 328/55, 56, 63, 72; 340/347 DD, 347 AD

[56] References Cited

UNITED STATES PATENTS

| | | | |
|---|---|---|---|
| 3,185,963 | 5/1965 | Peterson et al. | 178/69.5 R |
| 3,268,657 | 8/1966 | Peth | 178/69.5 DC |
| 3,363,183 | 1/1968 | Bowling et al. | 328/63 |
| 3,573,634 | 4/1971 | Rachel | 178/69.5 R |
| 3,593,160 | 7/1971 | Moore | 328/28 |
| 3,705,398 | 12/1972 | Kostenbauer et al. | 340/347 DD |
| 3,745,248 | 7/1973 | Gibson | 178/69.5 R |

*Primary Examiner*—Malcolm A. Morrison
*Assistant Examiner*—Errol A. Krass
*Attorney, Agent, or Firm*—Philip M. Hinderstein

[57] ABSTRACT

In a digital data communication system of the type wherein digital data, synchronized by a reference clock, is applied to a counter, transitions of the digital data being utilized to reset the counter, the output of which is used to generate a coherant clock signal for the data, there is provided a system for assuring generation of the proper number of clock signals in the event of loss of data. According to the present invention, the counter is a recirculating counter and there is provided means responsive to the data for generating a data dropout signal when the amplitude level of the data falls below a predetermined threshold level and means responsive to the dropout signal for inhibiting the transitions of the data from resetting the counter which continues to circulate, permitting the output thereof to be decoded to generate artificial clock pulses during the duration of the dropout signal. The counter is clocked by timing pulses which are phase locked to the reference clock whereby the artificial clock pulses are related to the desired period of the data.

32 Claims, 6 Drawing Figures

CLOCK SIGNAL ASSURANCE IN DIGITAL DATA COMMUNICATION SYSTEMS

BACKGROUND OF THE INVENTION

1. Field of the Invention

The present invention relates to clock signal assurance in digital data communication systems and, more particularly, to a system for defining the beginning and ending of data dropout in a digital data communication system and for inserting artificial clock pulses during the data dropout period.

2. Description of the Prior Art

When transmitting serial digital data over a data communication network, a clock signal is generally used to provide synchronous timing capabilities. In such networks, there will be instances in which there is a loss of data with a consequent loss of clock signals. Since the station receiving the data relies upon the clock signals for proper synchronization and reassembly of the data, provision must be made for maintaining synchronization in the event of loss of data and clock signals.

For example, assume data is being transmitted from a spacecraft to a ground station. Typically, the spacecraft will have a very stable, high frequency reference clock which is used for the accumulation and transmittal of the digital data. In such a situation, the most common approach used by the ground station for locking to the frequency of the reference clock relies on the inertia of a phase locked loop. More specifically, the decoder at the ground station utilizes a phase locked loop having a very low bandwidth of response to generate a clock. The frequency received from the spacecraft is used to maintain the loop in synchronism. In the event of loss of data and/or clock signals, there will be no loss of synchronization because of the high inertia of the loop. Thus, on the assumption that the frequency of the received signal is very stable, loss of a few or several clock signals will not adversely effect decoding of the data.

On the other hand, in many cases, data is first recorded on a magnetic tape recorder and thereafter reproduced for transmission over the data communication network. In electromechanical instruments, such as tape recorder mechanisms, the medium upon which the data is recorded is elastic and continuously expands and retracts as it is fed through the record and reproduce mechanisms. This being the case, there are instantaneous changes in timing rates, i.e. time base errors, which are significant enough that the receiving station can no longer assume that it is receiving a highly stable frequency.

In cases such as these, the initial attempts to adjust to changes in the received frequency still utilized phase locked loop generated clocks, but the loop was given more bandwidth so that it would respond faster to changes in the data rate. However, these systems now required precise balancing of the bandwidth to meet what is, in effect, two competing requirements. On the one hand, high inertia was required to maintain synchronization in the presence of loss of data. On the other hand, low inertia was required to follow changes in the data rate. Previous attempts to reconcile these differing requirements have generally been unsuccessful.

The theoretical upper limit of a very low inertia synchronizer is the purely digital system wherein the data itself is utilized to generate a clock signal which is instantaneously synchronized with the transitions of the data. For example, in U.S. Pat. No. 3,705,398, issued Dec. 5, 1972, for Digital Format Converter and assigned to Odetics, Inc., the assignee of the present application, there is disclosed apparatus for converting serial digital data, which is phase-encoded in accordance with any bi-phase or double density format, into its NRZ format equivalent accompanied by a coherent clock signal. The input data and a train of timing pulses are applied to a counter, transitions of the digital data being utilized to reset the counter which generates a series of pulses at predetermined counts of the timing pulses. The output of the counter together with the transitions of the data are applied to a flip-flop, the output of which comprises a coherent clock signal.

If a system such as described in the before-mentioned patent is utilized to generate a coherent clock signal for serial digital data, time base errors are eliminated since the clock signal is synchronized on a bit by bit basis. On the other hand, in the event of loss of data, hereinafter referred to as a data dropout, which is often the direct result of the loss of intimate contact between the tape and the reproduce head, the data required for generation of the clock signal is lost which makes it essentially impossible for the station receiving the data to properly interpret it. Thus, in such a system, it is necessary that the correct number of clock pulses always be transmitted, without even a single clock signal being added or subtracted, and that the system operate to respond instantaneously when a data dropout occurs.

SUMMARY OF THE INVENTION

According to the present invention, there is provided a digital data communication system which solves these problems in a manner unknown heretofore. The present digital data communication system eliminates the high inertia flywheel approach to the problem of the synchronization of digital data and permits full utilization of a digital system which responds instantaneously to the data on a bit by bit basis. With the present system, the digital data, which is synchronized by a reference clock, is applied to a counter, transitions of the data being utilized to reset the counter, whereby the output of the counter may be decoded to generate a coherent clock signal which is synchronized with the data on a bit by bit basis. The present system operates to sense a data dropout so that the transitions of the data, which may now be spurious, are inhibited from resetting the counter. The present system operates to instantaneously generate artificial clock pulses during the duration of the dropout period so that data dropouts do not alter the number of clock pulses between synchronizing signals of the data. Furthermore, at the termination of the dropout period, the present system delays application of the data transitions to the counter for at least one period of the data to prevent spurious transitions of the data from generating unwanted clock signals.

Briefly, the present digital data communication system includes a recirculating counter which receives digital data, synchronized by a reference clock, whereby transitions of the digital data reset the counter, the output of which is used to generate a coherent clock signal for the data. Means are provided for generating a data dropout signal when the amplitude level of the data falls below a predetermined threshold level. Means responsive to the dropout signal inhibit the transitions of the data from resetting the counter which thereafter continues to circulate, generating artificial clock pulses during the duration of the dropout signal. The counter is clocked by timing pulses which are phase locked to the reference clock whereby the artificial clock pulses are related to the desired period of the data.

OBJECTS

It is therefore an object of the present invention to provide clock signal assurance in digital data communication systems.

It is a further object of the present invention to provide a system for defining the beginning and ending of a data dropout in a digital data communication system.

It is a still further object of the present invention to provide a system for inserting artificial clock pulses during the duration of data dropout in a digital data communication system.

It is another object of the present invention to provide a system for inserting artificial clock pulses during the duration of a data dropout in digital data communication systems and for delaying the generation of the normal clock signal upon termination of data dropout.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

DESCRIPTION OF THE PREFERRED EMBODIMENTS

The present techniques for defining the beginning and ending of a data dropout and for assuring the generation of the proper number of clock signals before, during, and after dropout is applicable regardless of whether the input serial digital data has been phase-encoded in one of the standard bi-phase formats, in a double density format, or in any other format. On the other hand, implementation of the present techniques will differ depending upon the exact format under consideration. Thus, while the implementation of the present techniques is the same regardless of which bi-phase format is utilized, such implementation will be different from that for a double density format since the highest frequency of the double density format is only half of the highest frequency of any of the bi-phase formats. Thus, the present invention will first be described as applied to a bi-phase format and will then be described as applied to a double density format. Implementations for other known phase-encoded formats will be obvious to those skilled in the art.

Figure 1:
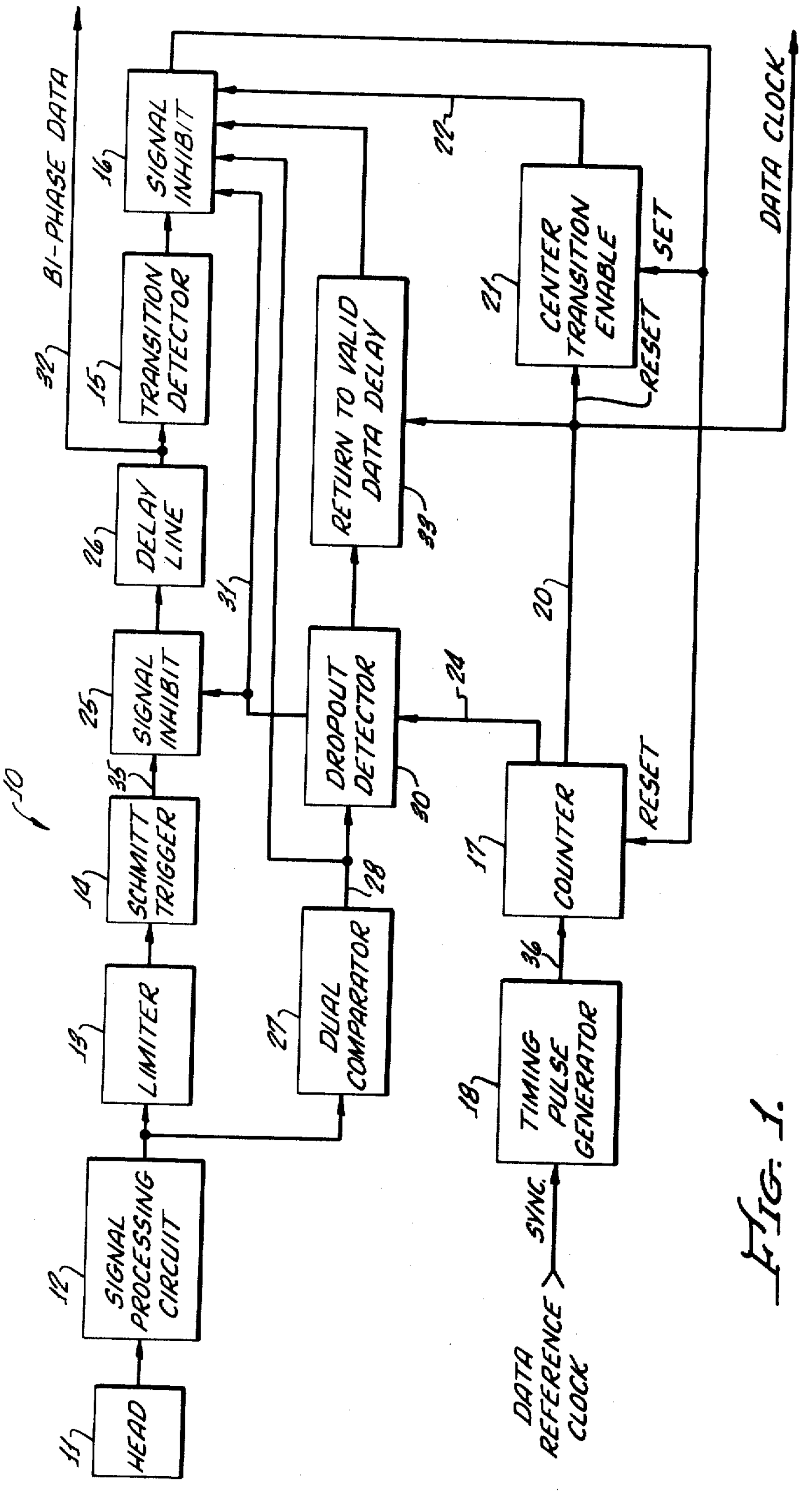
FIG. 1 is a block diagram of a first embodiment of digital data communication system including clock signal assurance wherein the input data is phase-encoded in accordance with a bi-phase format.

Referring now to the drawings and, more particularly, to FIG. 1 thereof, there is shown a generalized block diagram of a first embodiment of digital data communication system 10 for receiving, from the head 11 of a tape recorder (not shown), input serial digital data which has been phase-encoded in a bi-phase format, for utilizing such data to generate a coherent clock signal, and for transmitting the bi-phase data with the bi-phase data clock. According to the present invention, system 10 also includes means for defining the beginning and ending of a data dropout, for processing only valid transitions of the digital data, for inserting artificial clock pulses during the dropout period, and for insuring that the artificial clock pulses and the data clock pulses are phased coherently.

System 10, in the absence of clock signal assurance, includes signal processing circuitry 12 which receives the digital data from head 11 in analog form and, after suitable processing known to those skilled in the art, applies the signal to a limiter 13 and a Schmitt trigger 14. The output of Schmitt trigger 14 is the data in the normal digital format in which the signal is essentially a rectangular wave which alternates between two levels. Hereinafter, the higher level will be indicated as representing a "1" and the lower level will be indicated as representing a "0." The output of Schmitt trigger 14 is normally applied to a leading and trailing edge transition detector 15 which generates a "1" for every leading and trailing edge transition of the input data. The leading and trailing edge pulses from detector 15 are applied via a signal inhibit circuit 16 to the reset input of a ring counter 17. Counter 17 is clocked by timing pulses from a timing pulse generator 18 which is driven from and synchronized by the data reference clock for system 10. For purposes of the present invention, timing pulse generator 18 generates exactly twenty-four timing pulses for each bit cell, the timing pulses from generator 18 being exactly synchronized with the data reference clock.

The leading and trailing edge transitions of the data are utilized to reset counter 17 which then counts timing pulses from generator 18 and generates a data clock on a line 20 at a predetermined count after each valid transition. On the other hand, in the case of bi-phase data, it is desired that there be but a single data clock for every bit cell. Thus, system 10 includes circuitry, generally designated 21, to be described more fully hereinafter, which permits only pulses coinciding with a certain point in the data stream from passing signal inhibit circuit 16. According to the preferred embodiment of the invention, only transitions at the center of a bit cell pass through signal inhibit 16, such transitions being applied not only to the reset input of counter 17 but also to center transition enable circuit 21. The passed transition causes enable circuit 21 to apply an inhibiting input over a line 22 to signal inhibit 16. Circuit 16 prevents the leading and trailing edge transition pulses from detector 15 from passing to counter 17 until center transition enable 21 is reset by the data clock on line 20. By causing the data clock to occur approximately three quarters of a bit cell after the center transition, all transitions at the beginning and end of a bit period are blocked at signal inhibit circuit 16. On the other hand, on the occurrence of the bi-phase data clock on line 20, the inhibiting signal on line 22 is removed so that the next transition passes through signal inhibit circuit 16 to counter 17 and center transition enable 21.

According to the present invention, system 10 is modified so as to sense a data dropout, which is often the direct result of the loss of intimate contact between the tape and head 11, to inhibit transitions of the data from resetting counter 17 during such dropout, and to continue generating data clocks until the end of a dropout. For this purpose, system 10 includes a signal inhibit circuit 25 and a delay line 26 connected in series between Schmitt trigger 14 and transition detector 15. System 10 also includes a dual comparator 27 which receives the output of signal processing circuit 12 and generates an output on a line 28 which is a function of the amplitude level of the data. More specifically, dual comparator 27 includes positive and negative reference levels equally spaced on opposite sides of the nominal DC level of the signal from head 11. Whenever the signal from processor 12 is above the positive reference level or below the negative reference level, the output of comparator 27 will be a "0." Should the analog signal amplitude fall between the two reference levels, the output of comparator 27 switches to a "1." Thus, a spike appears at the output of comparator 27 at each transition of the data. However, this spike is normally of an insufficient duration to affect the operation of system 10. However, should the output of comparator 27 remain "1" for more than one-quarter of a bit cell, the signal on line 28 is applied to signal inhibit circuit 16 to prevent transitions from passing from detector 15 to counter 17.

The output of dual comparator 27 on line 28 is also applied to a dropout detector 30 which receives, at its second input, a signal on a line 24 from counter 17 when counter 17 has counted twenty-four timing pulses from generator 18 after being reset by a signal from detector 15. As will be described hereinafter, detector 30 uses these two inputs to establish a dropout thereby applying a signal via a line 31 to signal inhibit circuits 16 and 25. This signal not only inhibits the output of detector 15 from being applied to counter 17 but also prevents the input data from being applied to delay line 26, the output of which normally provides the bi-phase data which is transmitted over a line 32 with the data clock on line 20.

When the analog signal level again returns to a normal level, the output of dual comparator 27 will change back to a "0," thereby resetting dropout detector 30. However, resetting of dropout detector 30 operates to activate a delay circuit 33 which, under the control of the output of counter 17 on line 20, operates to continue to inhibit circuit 16 for at least one bit cell period before allowing valid data transitions from reaching counter 17. In this way, sufficient time is allowed so that any spurious transitions that may occur when the analog signal is emerging from the dropout region are avoided.

During dropout, when signal inhibit circuit 16 is preventing the reset of counter 17, counter 17 continues to circulate under the control of the timing pulses from timing pulse generator 18. Thus, counter 17 continues to generate bi-phase data clock pulses on line 20, which artifically generated clock pulses are equal in number to the previously generated coherent clock pulses. Furthermore, since counter 17 had been reset by the last valid transition which passed through signal inhibit circuit 16, there is instantaneous phase synchronization between the bi-phase data clock on line 20 and the data at the moment of dropout. The data reference clock is then used to insure that the reconstructed clock does not lose its phase relationship with the data transitions during the dropout period. Under these conditions then, the clock is considered assured as long as the time base error build up, contributed by all sources of transport and electronic components, does not exceed ± ¼ of a bit cell.

Delay line 26 introduces a delay into the input data which is approximately one-quarter of the period of the highest frequency of the data. In the case of bi-phase data, where the period of the highest frequency of the data is equal to the bit period, delay line 26 introduces a one-quarter bit period delay in the input data. This delay is required in order to make a decision as to whether a detected transition is valid or has occurred during a dropout. In other words, a delay of one-quarter bit period is required due to the fact that the maximum amplitude of the analog signal occurs one-quarter of a bit period after a transition and it is not until the maximum amplitude of the signal occurs that it can be determined whether such maximum amplitude is above or below one of the reference levels established by comparator 27. Thus, the data is delayed for one-quarter of a bit period while dual comparator 27 is determining whether the maximum amplitude reaches one of the reference levels. Until it does, the output of comparator 27, on line 28, inhibits any detected transition from passing through signal inhibit 16. However, if the maximum amplitude of the analog signal exceeds one of the reference levels, the inhibiting signal on line 28 is removed from signal inhibit circuit 16 by the time the transition passes through delay 26 and causes a pulse at the output of detector 15.

Summarizing the operation of system 10, the input data is passed through delay 26 and detected in detector 15 to generate pulses which, if passed through signal inhibit 16, will reset counter 17. Comparator 27 senses the amplitude of the signal from head 11 and defines a dropout region when the analog signal level drops approximately 26 dB below the nominal signal level. When this occurs, the dual comparator output switches from a "0" to a "1." A "1" at the output of comparator 27 operates to inhibit the detected transitions from resetting counter 17 and also, together with the 24-count from counter 17, to set dropout detector 30. Setting of dropout detector 30 prevents the input data from passing through signal inhibit circuit 25 to delay 26. At this time, counter 17 continues to circulate, under the control of timing pulse generator 18, generating artificial clock pulses on line 20 until such time as it is decided that the analog signal is again valid.

When the analog signal level again returns to above the −26 dB level, the output of dual comparator 27 changes back to a "0." This resets dropout detector 30, removing the inhibiting signal from line 31 and permitting data to be applied to delay 26. However, at this time, return to valid data delay 33 is activated so that the transitions of the data are prevented from resetting counter 17 for at least one, but not more than two bit cell periods. This is sufficient time so that any spurious transitions that may occur when the analog signal is emerging from the dropout region are avoided.

Figure 2:
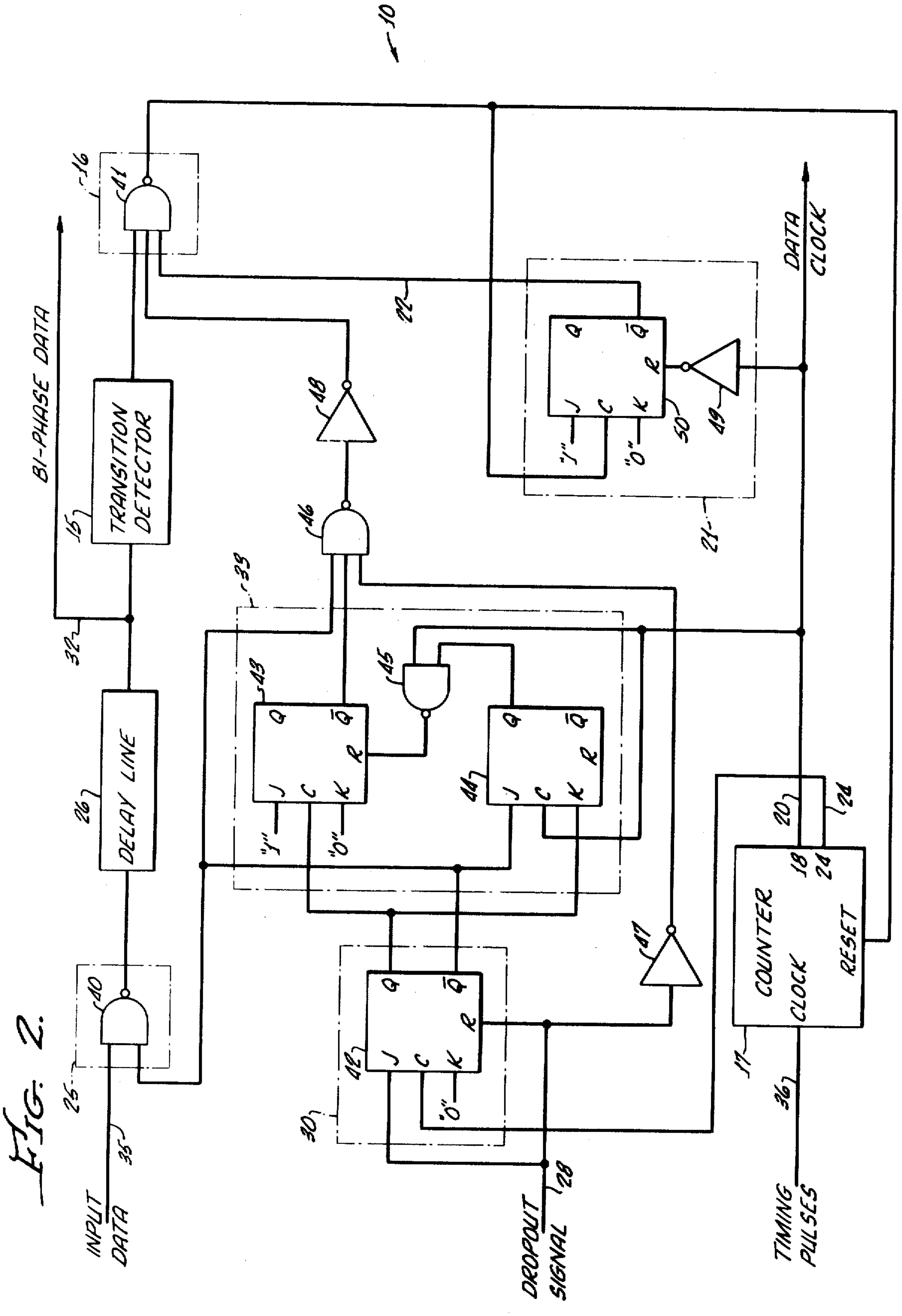
FIG. 2 is a more detailed circuit diagram of selected portions of the system of FIG. 1.

Referring now to FIG. 2, there is shown a more detailed block diagram of the major elements of system 10. In the embodiment of FIG. 2, system 10 is constructed from a plurality of J–K flip-flops, a plurality of inverters, and a plurality of NAND gates of standard design (see Montgomery Phister, Jr., "Logical Design of Digital Computers," New York, John Wiley & Sons, Inc., 1959). Each of the J–K flip-flops has J and K input terminals, a clock input terminal C, and a reset input terminal R. In addition, each of the J–K flip-flops has two complementary outputs indicated by Q and $\overline{Q}$. With a "1" at the J input terminal and a "0" at the K input terminal, a pulse at the C input terminal causes a "1" to appear at the Q output terminal and a "0" to appear at the $\overline{Q}$ output terminal. With the inputs reversed and a "1" at the K input terminal and a "0" at the J input terminal, a pulse at the C input terminal causes a "1" to appear at the $\overline{Q}$ output terminal and a "0" to appear at the Q output terminal. If the inputs to the J and K terminals are both a logical "1," a pulse at the C input terminal causes the flip-flop to change state. However, if the inputs to the J and K terminals are both "0," a pulse at the C input terminal does not change the state of the flip-flop. Finally, a "0" at the R input terminal causes the flip-flop to generate a "0" at the Q output terminal and a "1" at the $\overline{Q}$ output terminal. The inverters simply invert the polarity of the input signal whereas the NAND gates are operative to generate a "0" at their output terminals only when all inputs are "1." For any other input condition, the output of the NAND gates are "1." In FIG. 2, line 35 is the bi-phase data input from the output of Schmitt trigger circuit 14, line 28 receives the output from dual comparator 27, and line 36 carries the timing pulses from generator 18.

Signal inhibit 25 consists of a two-input NAND gate 40, one of which inputs receives the input data on line 35. The output of gate 40 is applied to delay line 26, as described previously, the output of which provides the delayed bi-phase data. Signal inhibit 16 consists of a three-input NAND gate 41 which receives, at one of its inputs, the output from transition detector 15. Transition detector 15 generates a "1" for each detector transition, which "1" results in a "0" at the output of NAND gate 41 if both of the other inputs thereto are simultaneously "1."

Counter 17 may be similar to the counter described in the before-mentioned U.S. Pat. No. 3,705,398 and may comprise twelve flip-flops, not shown, interconnected so as to count timing pulses appearing on line 36 from timing pulse generator 18. For the purposes of the present invention, the output of NAND gate 41 is applied to the reset input terminal of counter 17 so as to reset all of the flip-flops to the initial count whenever the output of NAND gate 41 changes from a "1" to a "0." Counter 17 then continues to count timing pulses on line 36 and generates a "1" on line 20 upon the occurrence of the 18th timing pulse from generator 18 after being reset and a "1" on line 24 upon the occurrence of the 24th timing pulse from generator 18 after being reset. If not reset at this time, counter 17 returns to a zero count and continues counting timing pulses on line 36. An 18-count represents ¾ of a bit period and the 24-count represents one full bit period since counter 17 was reset.

Dropout detector 30 consists of a flip-flop 42. The dropout signal on line 28 from dual comparator 27 is applied to the J and R inputs of flip-flop 42, the K input of which receives a "0." The 24-count from counter 17, on line 24, is applied to the C input of flip-flop 42.

Return to valid data delay 33 comprises first and second flip-flops 43 and 44 and a two-input NAND gate 45. The Q output of flip-flop 42 is applied to the C input of flip-flop 43 and to the K input of flip-flop 44. The $\overline{Q}$ output of flip-flop 42 is applied to the J input of flip-flop 44 as well as to the other input of NAND gate 40. The J and K inputs of flip-flop 43 receive a "1" and a "0," respectively. The 18-count from counter 17, on line 20, is applied to the C input of flip-flop 44 as well as to one input of NAND gate 45. The other input of NAND gate 45 is connected to the Q output of flip-flop 44, the output of gate 45 being applied to the R input of flip-flop 43.

In order to achieve the signal inhibit functions of system 10, system 10 further includes a three-input NAND gate 46 and first and second inverters 47 and 48. The dropout signal from dual comparator 27, on line 28, is applied via inverter 47 to one input of NAND gate 46, a second input of which is connected to the $\overline{Q}$ output of flip-flop 43. The third input to NAND gate 46 is derived from the $\overline{Q}$ output of flip-flop 42. The output of NAND gate 46 is applied via inverter 48 to a second input to NAND gate 41.

Center transition enable 21 comprises an inverter 49 and a flip-flop 50. The output of NAND gate 41 is applied to the C input of flip-flop 50, the $\overline{Q}$ output of which is applied to the third input of NAND gate 41. The J and K inputs of flip-flop 50 receive a "1" and a "0," respectively. The 18-count from counter 17, on line 20, is applied via inverter 49 to the R input of flip-flop 50. It should also be noted that the 18-count from counter 17, on line 20, comprises the bi-phase data clock for system 10.

The operation of system 10 will now be described in connection with the waveforms of FIG. 3. A typical analog input signal, phase-encoded in accordance with a bi-phase format, is shown as waveform a with its NRZ significance indicated immediately thereabove. This signal would appear at the output of signal processing circuit 12 and is applied to limiter 13 and dual comparator 27. Superimposed on waveform a are the first and second reference levels 51 and 52 of dual comparator 27, the output of which is shown as waveform *c*. Thus, it is seen that each time waveform a passes between reference levels 51 and 52, the normally "0" output of comparator 27 changes to a "1." This will be discussed more fully hereinafter.

The bi-phase digital equivalent of the analog data input, which appears at the output of Schmitt trigger 14, on line 35, is shown as waveform *b*. Waveform d shows this same signal after it has passed through delay line 26. The output of NAND gate 41 is shown as waveform *e*, the 18-count output of counter 17, on line 20, is shown as waveform *f*, and the 24-count output of counter 17, on line 24, is shown as waveform *g*.

The $\overline{Q}$ output of flip-flops 50, 42, and 43 are shown as waveforms *h*, *i*, and *j*, respectively, whereas the Q output of flip-flop 44 is shown as waveform *k*. Finally, the output of inverter 48 is shown as waveform *m*.

In the presence of valid data from signal processing circuit 12, the signal on line 28 from dual comparator 27 is a "0," as shown at 37 in waveform *c*, and only changes to a "1" for a brief period for each transition of the bi-phase data, such as shown at 38 and 39 in waveform *c*. This "0" on line 28 is applied to the R input of flip-flop 42 which remains reset, with a "1" at its $\overline{Q}$ output, as shown at 23 in waveform *i*. The "1" at the $\overline{Q}$ output of flip-flop 42 is applied to NAND gate 40 which is enabled to generate a "0" at its output whenever the bi-phase data is a "1" and a "1" whenever the bi-phase input is a "0."

The "1" and "0" at the $\overline{Q}$ and Q outputs, respectively, of flip-flop 42 are applied to the J and K inputs, respectively, of flip-flop 44 which is then set by the trailing edge of the 18-count from counter 17, on line 20, thereby normally generating a "1" at the Q output, as shown at 24 in waveform *k*. This "1" is applied to NAND gate 45 which generates a "0" at its output upon the occurrence of every 18-count pulse from counter 17. This "0" is applied to the reset input of flip-flop 43, thereby insuring that flip-flop 43 is in its reset condition with a "1" at its $\overline{Q}$ output terminal, as shown at 29 in waveform *j*.

The "1" which appears at the $\overline{Q}$ output of flip-flop 42 and the "1" which appears at the $\overline{Q}$ output of flip-flop 43 are applied as two inputs to gate 46. The "0" which normally appears on line 28 is inverted by inverter 47 and applied as a "1" to the other input of gate 46 so that the output of which is normally a "0." This "0" is inverted to a "1" in inverter 48, the output of which is shown as waveform *m* and applied as a first enabling input to gate 41.

Figure 3:
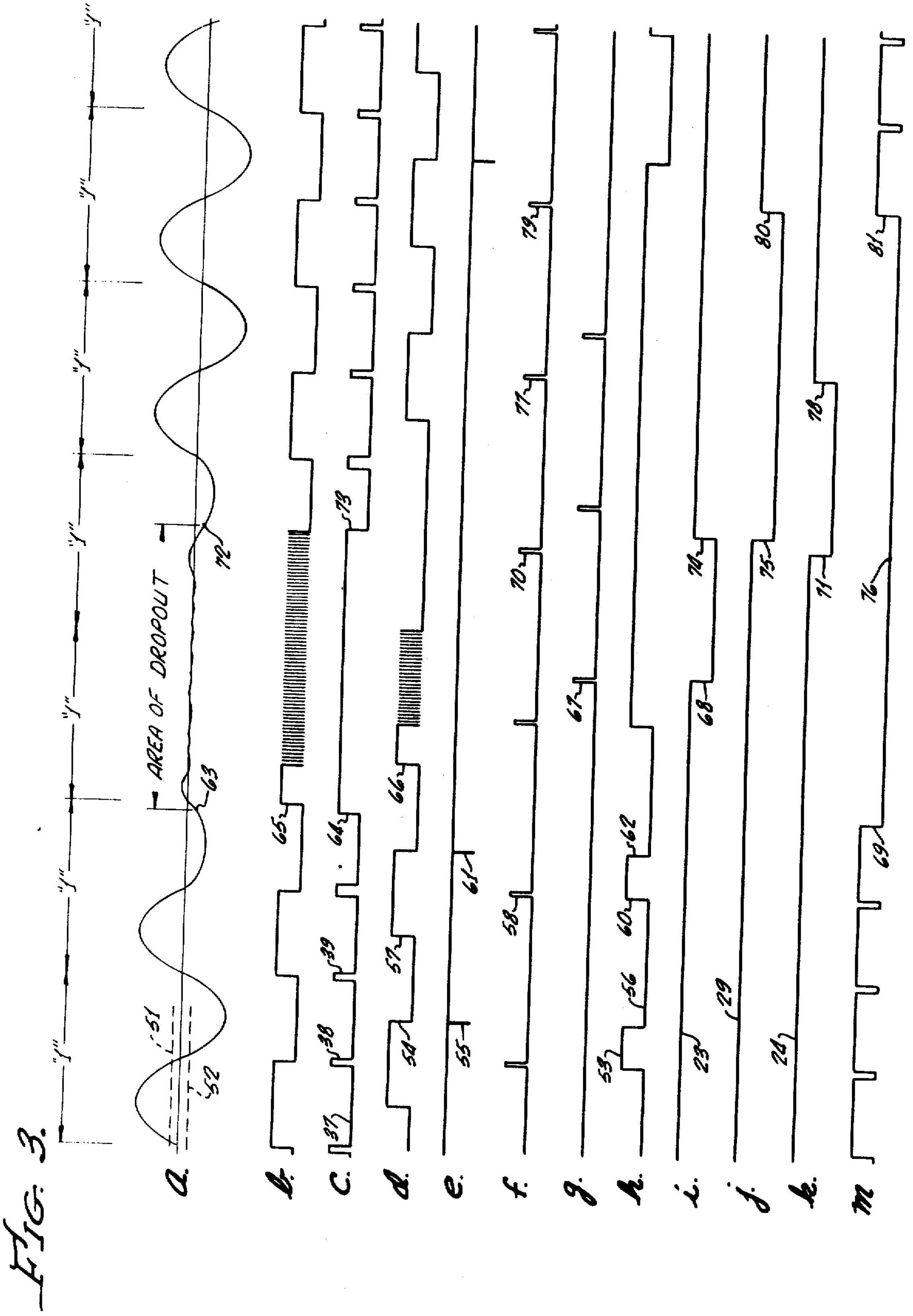
FIG. 3 is a series of waveforms useful in explaining the operation of the system of FIGS. 1 and 2.

With reference to waveforms *c* and *m* in FIG. 3, it is seen that each time the analog data passes between reference levels 51 and 52, a "1" is generated on line 28 and a "0" is generated at the output of inverter 48. As long as this pulse is narrower than one-quarter of a bit period, it does not effect the operation of flip-flop 42 or the normal operation of gate 41. On the other hand, all transitions detected by detector 15 are not passed through gate 41. More specifically, gate 41 will only pass a positive pulse from detector 15 when flip-flop 50 is in the reset condition. Thus, with flip-flop 50 reset, as shown at 53 in waveform *h*, the next transition of the delayed bi-phase data, at 54 in waveform *d*, causes a positive pulse to be generated at the output of transition detector 15. Since all inputs to NAND gate 41 are now "1," a "0" appears at the output thereof, as shown at 55 in waveform *e*. This output is applied to the clock input C of flip-flop 50 which is now set, generating a "0" at the $\overline{Q}$ output, as shown at 56 in waveform *h*. Thus, the transition pulse generated by detector 15 when the delayed bi-phase data changes state at 57 will be inhibited from passing through gate 41. Gate 41 remains inhibited for three-quarters of a bit cell, until an 18-count is generated on line 20 by counter 17. This positive pulse, shown at 58 in waveform *f*, is applied via inverter 49 to reset flip-flop 50 which changes state, as shown at 60 in waveform *h*. The next transition is then passed by gate 41, as shown at 61, in waveform *e*, again setting flip-flop 50, as shown at 62 in waveform *h*. It is thus seen that flip-flop 50, in combination with counter 17, insures that only a single pulse will pass through gate 41 for each bit period, the 18-count of counter 17 being used to inhibit gate 41 for at least three-quarters of a bit cell.

Referring again to waveform a of FIG. 3, it is seen that the data remains reliable until a point 63 at which time the data becomes unreliable and dropout begins. At point 63, the amplitude level of the bi-phase data enters the area between reference levels 51 and 52 and the output of dual comparator 27 changes to a "1," as seen at 64 in waveform *c*, where it remains until the end of dropout. While the entering of the analog signal at the output of signal processing circuit 12 into the area between reference levels 51 and 52 causes a transition of the bi-phase data on line 35, as seen at 65 in waveform *b*, this transition is considered unreliable. Thus, when the delayed transition as seen at 66 in waveform *d*, reaches gate 41, gate 41 is inhibited by the output of comparator 27. More specifically, the "1" on line 28 is inverted by inverter 47 applying a "0" to gate 46, the output of which goes to "1", producing a "0" at the output of inverter 48, as seen at 67 in waveform *m*. This "0" operates to inhibit all additional transitions from passing through gate 41.

During the dropout period, counter 17 continues to count timing pulses on line 36 from generator 18, generating a bi-phase data clock every time the count of 18 is reached, as described previously. Since the timing input to counter 17 is phase locked to the data reference clock, the artificial clocks produced by counter 17 will be related to the desired period of the bi-phase bit period. As long as the artificial clocks and the actual period of the bi-phase data remain within ± ¼ bit period of each other during the dropout, proper relationship will exist between the data and the bi-phase data clock upon reemergence from dropout. Thus, the present circuitry will tolerate a time base error build-up of ± ¼ bit period while maintaining the desired performance.

At the initiation of a data dropout, as signified by the signal on line 28 from comparator 27 going from a "0" to a "1," the reset input to flip-flop 42 is released and a "1" is simultaneously applied to the J and R inputs of flip-flop 42. Thus, should this condition prevail upon the occurrence of a 24-count pulse from counter 17, on line 24, as shown at 67 in waveform *g*, flip-flop 42 will be set upon the termination of this pulse, as shown at 68 in waveform *i*, so that flip-flop 42 now generates a "1" and "0" at its Q and $\overline{Q}$ outputs, respectively. The "0" at the $\overline{Q}$ output of flip-flop 42 is applied to signal inhibit gate 40 as an added protection so that the spurious data is not applied to delay line 26. The "0" at the $\overline{Q}$ output of flip-flop 42 is also applied as a second inhibiting input to gate 46. In addition, the "1" and "0" which appears at the Q and $\overline{Q}$ outputs of flip-flop 42 are applied to the K and J inputs, respectively, of flip-flop 44. Thus, upon the occurrence of the next data clock on line 20, as seen at 70 in waveform *f*, flip-flop 44 is reset, as seen at 71 in waveform *k*, generating a "0" at its Q output terminal. This "0" removes the reset signal from the R input of flip-flop 43. However, flip-flop 43 does not change state at the present time since it only changes state upon the occurrence of a trailing edge signal at its C input terminal.

The return to valid data operation, at the end of a dropout, is initiated when the analog signal level from signal processing circuit 12 rises above or falls below one of reference levels 51 or 52. This condition is seen at 72 in waveform *a*. This causes the dropout signal on line 28 to return to a "0" level, as seen at 73 in waveform *c*. This "0" on line 28 is applied immediately to flip-flop 42 which is reset, as seen at 74 in waveform *i*. However, even though the $\overline{Q}$ output of flip-flop 42 is again a "1" and the output of inverter 47 is again a "1," so that gate 40 is enabled, gate 46 remains disabled because the trailing edge of the signal at the Q output of flip-flop 42 triggers flip-flop 43, which changes state, as seen at 75 in waveform *j*. The "0" which now appears at the $\overline{Q}$ output of flip-flop 43 is applied to gate 46 so that the output of inverter 48 remains a "0," as seen at 76 in waveform *m*, disabling gate 41. Thus, system 10 operates to prevent transitions from passing through gate 41 for an additional period of time so as to avoid any spurious transitions that may occur when the analog signal is emerging from the dropout region.

More particularly, when flip-flop 42 is reset, as seen at 74 in waveform *i*, the "0" and "1" at the Q and $\overline{Q}$ outputs thereof are applied to the K and J inputs, respectively, of flip-flop 44. Therefore, upon the trailing edge of the next data clock on line 20 from counter 17, as seen at 77 in waveform *f*, flip-flop 44 will be reset, applying a "1" to a first input of gate 45, as seen at 78 in waveform *k*. Since flip-flop 44 would reset on the trailing edge of the data clock at 77, gate 45 will not receive a "1" at the other input terminal thereof until the next data clock, as seen at 79 in waveform *f*. At this time, a "1" appears at both inputs of gate 45 which generates a "0" at the output thereof, immediately resetting flip-flop 43, as seen at 80 in waveform *j*. As soon as flip-flop 43 is reset, all of the inputs to gate 46 are now "1" and a "0" is generated at the output of gate 46. The output of inverter 48 returns to "1," as shown at 81 in waveform *m*. Since the two inhibiting inputs have been removed from gate 41, the next detected transition passes through gate 41 to reset counter 17 and to set flip-flop 50 and operation continues in the manner described previously.

Figure 4:
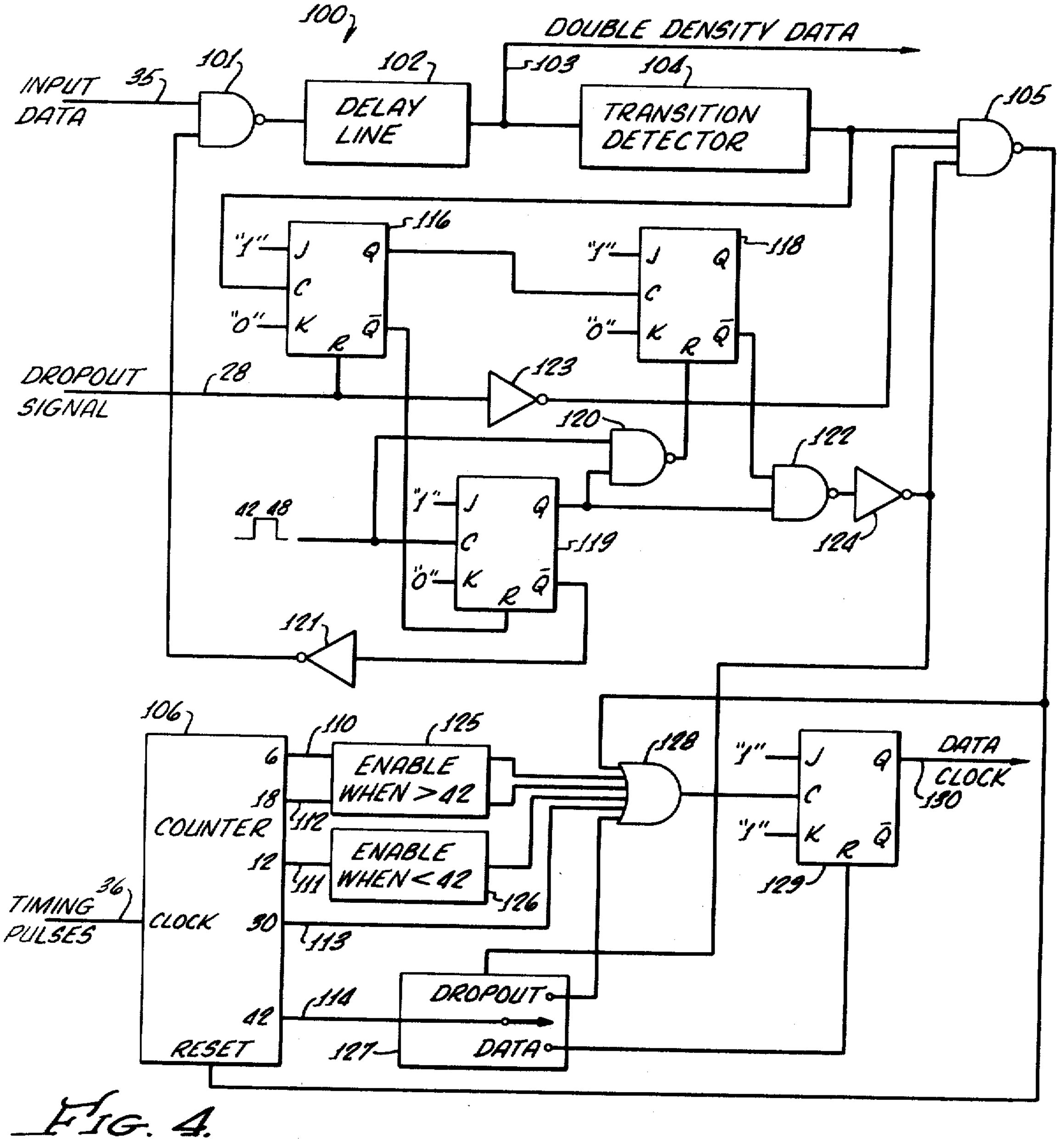
FIG. 4 is a circuit diagram of a second embodiment of digital data communication system including clock signal assurance wherein the input data is phase-encoded in accordance with a double density format.

Referring now to FIG. 4, there is shown a block diagram of a system 100 for receiving, from the head 11 (not shown) of a tape recorder (not shown), input serial digital data which has been phase-encoded in accordance with a double density format, for utilizing such data to generate a coherent clock signal, and for transmitting the double density data with a suitable data clock. According to the present invention, system 100 also includes means for defining the beginning and ending of a data dropout, for processing only valid transitions of the digital data, for generating artificial clock pulses during the dropout period, and for insuring that the artificial clock pulses and the data clock pulses are phased coherently.

System 100 is similar to system 10 and includes, as the inputs thereto, the double density input data on line 35 from the output of Schmitt trigger circuit 14 of FIG. 1, the dropout signal on line 28 from dual comparator 27 of FIG. 1, and the timing pulses on line 36 from timing pulse generator 18. As was the case in system 10, the input data on line 35 is applied to a first input of a two-input NAND gate 101, the output of which is applied to a delay line 102. Delay line 102 introduces into the data a delay which is approximately one-quarter of the period of the highest frequency of the data. In the case of double density data, where the period of the highest frequency is equal to twice the bit period, delay line 102 introduced a one-half bit period delay in the data. As was the case with delay line 26, this delay is required in order to make a decision as to whether a detected transition is valid or has occurred during a dropout.

The output of delay line 102 on line 103 represents the delayed, gated, double density data for transmission to a receiving station and is applied to a leading and trailing edge transition detector 104 which generates a "1" for every leading and trailing edge transition of the input data. The output of detector 104 is applied to one input of a three-input NAND gate 105, which receives, at another input, the dropout signal on line 28 via an inverter 123. The output of gate 105 is applied to the reset input of a ring counter 106. Counter 106 is clocked by pulses on line 36 from timing pulse generator 18, which is driven from and synchronized by the data reference clock for system 100. As was the case with system 10, there are exactly twenty-four pulses on line 36 for each bit cell, such timing pulses being exactly synchronized with the data reference clock signal.

The leading and trailing edge transitions of the data are utilized to reset counter 106 which then counts timing pulses on line 36 and generates a plurality of outputs at predetermined counts after each valid transition. As will be described more fully hereinafter, the primary difference between system 100 and system 10 is in the decoding of counter 106 because of the difference in the bi-phase and double density formats. Thus, counter 106 is capable of counting 48 pulses before returning to a zero count and provides outputs on lines 110 through 114 after 6, 12, 18, 30, and 42 timing pulses, respectively, have been counted after being reset. It should also be noted that due to the nature of double density data, where there is never more than one transition per bit period, all transitions are passed from gate 105 to the reset input of counter 106, except when dropout occurs, as will be described more fully hereinafter.

According to the present invention, system 100 is operative to sense a data dropout, to inhibit transitions of the data from resetting counter 106, and to continue generating data clocks until the end of a dropout. To do this, system 100 receives the output of dual comparator 27 on line 28 which is either a "0," indicating valid data, or a "1," indicating a data dropout. Circuit 100 also includes a dropout detector and a return to valid data delay although not specifically indicated as such. Rather, FIG. 4 shows a detailed block diagram of the major elements of system 100. In addition to the elements used to construct system 10, system 100 includes an OR gate of standard design which is operative to generate a pulse at its output terminal whenever a pulse appears at any of the inputs thereto.

Counter 106 may be similar to the counter described with regard to system 10, being operative to count clock pulses appearing on line 36. Counter 106 receives the output of NAND gate 105 at its reset input terminal so as to reset all of the flip-flops therein to the initial count whenever the output of NAND gate 105 changes from a "1" to a "0." Counter 106 then continues to count pulses on line 36 and generated a "1" on lines 110, 111, 112, 113, and 114 upon the occurrence of the 6th, 12th, 18th, 30th, and 42nd timing pulses, respectively, after being reset. If not reset by the time the 48th timing pulse is received, counter 106 automatically returns to a zero count and continues counting timing pulses on line 36.

The dropout detector of system 100 consists of flip-flop 116. The dropout signal on line 28 is applied to the R input of flip-flop 116 which receives, at its J and K inputs, a "1" and a "0," respectively. Flip-flop 116 differs from flip-flop 42 of system 10 primarily in that the output of transition detector 104 is applied to the C input of flip-flop 116 rather than that input being derived from counter 106. The reason for this is that with double density data, it is normal to have two full bit cells without a transition of the data. This occurs whenever a 0–1–0 signal is transmitted. Since it is not desirable to wait this long before establishing a dropout, dropout is detected by comparing the output of transition detector 104 with the output of dual comparator 27 on line 28. This will be described mrore fully hereinafter.

The circuitry for delaying the return to valid data comprises first and second flip-flops 118 and 119 and a NAND gate 120. The Q output of flip-flop 116 is applied to the C input of flip-flop 118 which receives, at its J and K inputs, a "1" and a "0," respectively. The $\overline{Q}$ output of flip-flop 116 is applied to the R input of flip-flop 119 which also receives, at its J and K inputs, a "1" and a "0," respectively. A pulse, derived from counter 106, which is a "1" between the 42nd and 48th counts of counter 106, is applied to the C input of flip-flop 119 and to one input of NAND gate 120. The Q output of flip-flop 119 is applied to the other input of NAND gate 120, the output of which is connected to the R input of flip-flop 118. The $\overline{Q}$ output of flip-flop 119 is connected via an inverter 121 to the other input of gate 101.

In order to achieve the signal inhibit functions of system 100, system 100 further includes a two-input NAND gate 122 and an inverter 124. The $\overline{Q}$ output of flip-flop 118 and the Q output of flip-flop 119 are applied to the inputs of NAND gate 122, the output of which is applied via inverter 124 to the third input of NAND gate 105.

Because of the peculiarities of double density data, system 100 includes certain additional elements, namely elements 125 through 129 which, as will be described more fully hereinafter, provide the proper decoding of counter 106 before, during, and after dropout so as to insure phase synchronization between the double density data clock, which appears on line 130, and the artificially generated data clock, which also appears on line 130. More specifically, element 129 is a flip-flop which receives a "1" at both its J and K inputs and which provides the double density data clock at its Q output. Flip-flop 129 receives, at its C input, the output of element 128, an OR gate. OR gate 128 has six inputs thereto, a first one of which is derived from the output of gate 105, second and third ones of which are derived from element 125, a fourth one of which is derived from element 126, a fifth on of which is connected to line 113, and a sixth one of which is derived from element 127. Element 125 is connected to line 110 and 112 from counter 106 and element 126 is connected to line 111 from counter 106. Elements 125 and 126 also receive inputs (not shown) from line 114 of counter 106 and from the output of gate 105.

Elements 125 and 126 are basically gating circuits which determine whether lines 110 and 112 or line 111 is to be applied to the inputs of OR gate 128. When the count in counter 106 reaches 42, element 125 is enabled by the "1" on line 114 and lines 110 and 112 are connected to gate 128. At this time, element 126 is disabled by the "1" on line 114 and line 111 is not connected to gate 128. However, when a "0" appears at the output of gate 105, element 126 is enabled and element 125 is disabled. This condition remains until a 42-count again appears on line 114 at which time element 125 is enabled and element 126 is disabled.

The output of counter 106 on line 114 is applied to element 127 which is basically a switching circuit which directs this count either to one input of OR gate 128 or to the reset input R of flip-flop 129, depending upon whether valid data or invalid data is being received by system 100. Thus, the output of inverter 124 is applied to element 127 which operates to apply the 42-count to the R input of flip-flop 129 in the presence of valid data and to apply such count to the C input of flip-flop 129 via NOR gate 128 in the presence of a data dropout.

The operation of system 100 will now be described in connection with the waveforms of FIGS. 5 and 6. A typical input signal, phase-encoded in accordance with a double density format, is shown as waveform *a* of FIG. 5 with its NRZ significance indicated immediately thereabove. This signal would appear at the output of signal processing circuit 12 of FIG. 1 and would be applied to a limiter and a dual comparator as described previously. Superimposed on waveform *a* are the first and second reference levels 51 and 52 of dual comparator 27, the output of which is shown as waveform *d*. Thus, it is seen that each time waveform a passes between reference levels 51 and 52, the normally "0" output of comparator 27 goes to a "1."

Figure 5:
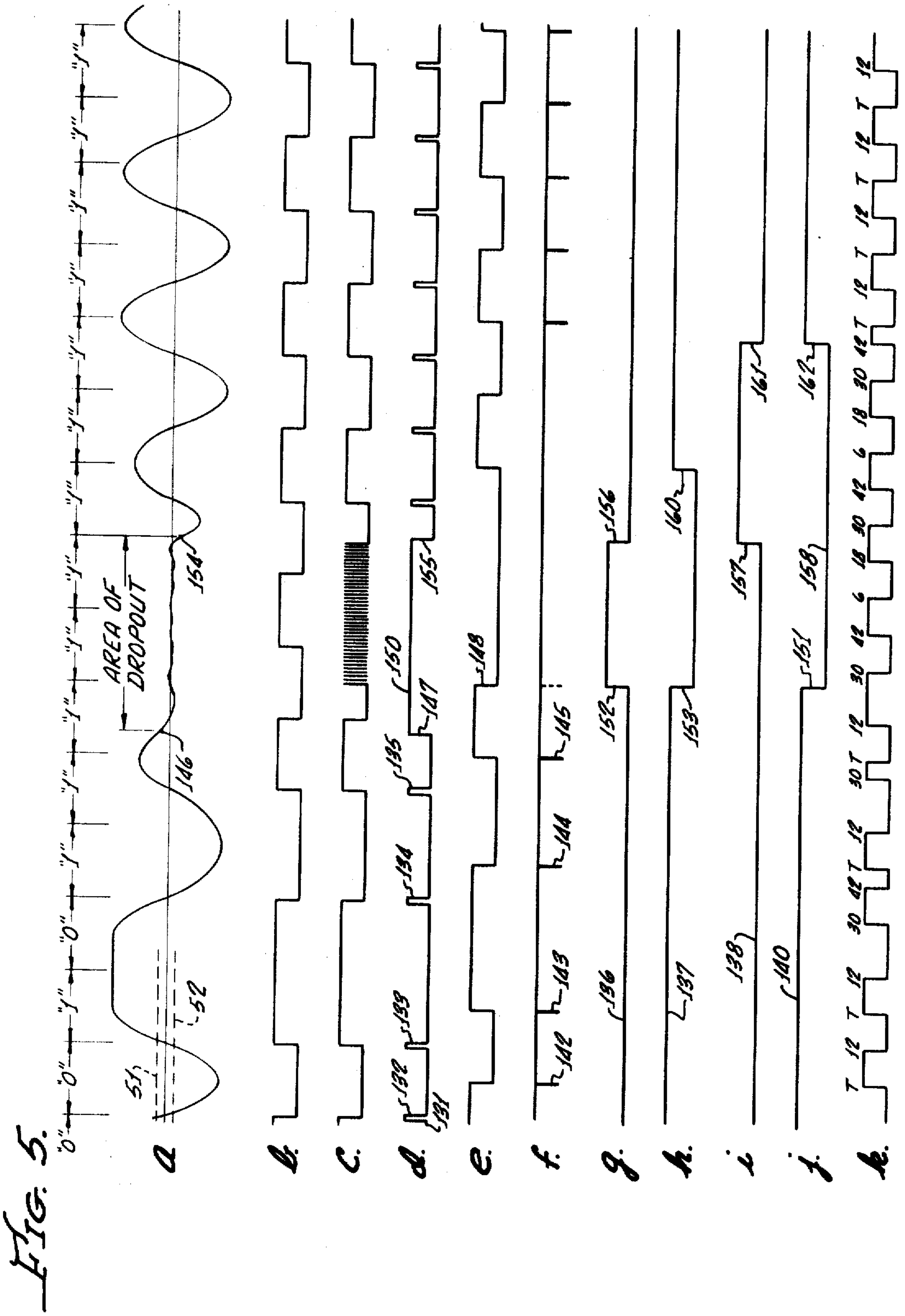

Waveform *b* of FIG. 5 is the ideal double density data equivalent of the analog data input which would appear on line 35, in the absence of data dropout. Waveform *c* is the real double density data on line 35 with an example of a data dropout. Waveform *e* is this same signal after it has passed through gate 101 and delay line 102. Waveform *f* is the output from gate 105 whereas waveforms *g*, *h*, and *i* are the Q outputs of flip-flops 116, 119, and 118, respectively. Waveform *j* is the dropout gate at the output of inverter 124 and waveform *k* is the double density data clock derived on line 130 from the Q output of flip-flop 129.

In the presence of valid data from signal processing circuit 12, the signal on line 28 from dual comparator 27 is a "0," as shown at 131 in waveform *d*, and only changes to a "1" for a brief period for transitions of the data, as shown at 132–135 in waveform *d*. This "0" on line 28 is applied to the R input of flip-flop 116 which remains reset with a "0" at its Q output, as shown at 136 in waveform *g*. This "0" is also inverted by inverter 123 and applied as a "1" to gate 105 as a first enabling input.

The "1" at the $\overline{Q}$ output of flip-flop 116 is applied to the R input of flip-flop 119 so as to remove the reset input thereto. Thus, whenever the 42–48 pulse occurs at the C input terminal, flip-flop 119 is set, generating a "1" at the Q output thereof, as seen at 137 in waveform *h*. The "1" at the Q output of flip-flop 119 is applied to one input of NAND gate 120, which receives a "1" at its other input whenever the 42–48 pulse appears. When this occurs, a "0" is applied to the R input of flip-flop 118 which is reset, normally generating a "0" at its Q output, as shown at 138 in waveform *i*.

The "1" which normally appears at the $\overline{Q}$ output of flip-flop 118 and the "1" which appears at the Q output of flip-flop 119 are applied as the two inputs to gate 122 so that the output thereof is normally a "0." This "0" is inverted to a "1" in inverter 124, the output of which, shown at 140 in waveform *j*, is applied as a second enabling input to gate 105.

With reference to waveforms d and f of FIG. 5, it is seen that each time the analog data passes between reference levels 51 and 52, a "1" is generated on line 28 and a "0" is generated at the output of inverter 123. As long as this pulse is narrower than one-half of a bit period, it does not effect the operation of flip-flop 116 or the normal operation of gate 105. In other words, if the maximum amplitude of the analog signal which caused the transition exceeds the reference level, the inhibiting signal on line 28 returns to a "0" by the time the transition passes through delay line 102 and causes a pulse at the output of transition detector 104. Thus, the transitions which caused pulses 132–135 appear at the output of transition detector 104, as shown at 142–145 in waveform *f*.

Referring again to waveform a of FIG. 5, it is seen that the data remains reliable until a point 146 at which time the data falls below reference level 51 and becomes unreliable, signaling the start of dropout. Thus, at point 146, the output of dual comparator 27 changes to a "1," as shown at 147 in waveform *d*, where it remains until the end of dropout. While the entering of the analog signal at the output of signal processing circuit 12 into the area between reference levels 51 and 52 causes a transition of the data on line 35, as seen at 148 in waveform *e*, and this transition passes through gate 101, it is considered unreliable. Thus, when this transition, at 148, reaches gate 105, gate 105 is inhibited by the output of comparator 27. More specifically, the "1" on line 28, as seen at 150 in waveform *d*, is inverted by inverter 123, applying a "0" to gate 105. This "0" operates to inhibit all additional transitions from passing through gate 105.

During the dropout period, counter 106 continues to count timing pulses on line 36, generating output pulses on line 110 through 114, as described previously. The outputs of counter 106 are used to generate clock 130, as will be described more fully hereinafter. In any event, since the timing input to counter 106 is phase locked to the data reference clock, the artificial clocks produced by counter 106 will be related to the desired period of the double density bit period. As long as the artificial clocks and the actual period of the double density data remain within ± ¼ bit period of each other during dropout, proper relationship will exist between the data and the data clock on line 130 upon reemergence from dropout.

At the initiation of dropout, as signified by the signal on line 28 changing from a "0" to a "1," the reset input to flip-flop 116 is released. Thus, should this condition prevail when the transition passes through delay line 102, as shown at 148 in waveform *e*, generating a transition at the output of detector 104, flip-flop 116 will be set, as shown at 152 in waveform *g*, so that flip-flop 116 now generates a "1" and a "0" at its Q and $\overline{Q}$ outputs, respectively. The "0" at the $\overline{Q}$ output of flip-flop 116 is applied to the R input of flip-flop 119 which is immediately reset, generating a "0" at its Q output, as shown at 153 in waveform *h*. The "1" at the $\overline{Q}$ output of flip-flop 119 is inverted by inverter 121 and applied as an inhibiting "0" to one input of gate 101, preventing further transitions of the data from reaching delay line 102. The "0" at the Q Output of flip-flop 119 is also applied as an inhibiting input to gate 122, producing a "1" at the output thereof which is inverted to a "0" by inverter 124, as seen at 151 in waveform *j*. Flip-flop 118 does not change state at the present time since it only changes state upon the occurrence of a trailing edge signal at its C input terminal.

The return to valid data operation, at the end of a dropout, is initiated when the analog signal level from signal processing circuit 12 rises above or falls below one of reference levels 51 or 52. This condition is seen at 154 in waveform *a*. This causes the dropout signal on line 28 to change from a "1" to a "0," as seen at 155 in waveform *d*. This "0" on line 28 is applied immediately to flip-flop 116 which is reset, as seen at 156 in waveform *g*. The trailing edge of the signal at the Q output of flip-flop 116 triggers flip-flop 118, which changes state, as seen at 157 in waveform i. The "0" which now appears at the $\overline{Q}$ output of flip-flop 118 and the "0" which now appears at the Q output of flip-flip 119 are applied to gate 122 so that the output of inverter 124 remains a "0", as seen at 158 in waveform *j*. Thus, system 100 operates to prevent transitions from passing through gate 105 for an additional period of time so as to inhibit any spurious transitions that may occur when the analog signal is emerging from the dropout region.

When flip-flop 116 is reset, the reset input to flip-flop 119 is released. Thus, upon the trailing edge of the next 42–48 pulse from counter 106, flip-flop 119 is again set, as shown at 160 in waveform *h*. While the Q output of flip-flop 119 now applies a "1" to one of the inputs of gate 120, the 42–48 pulse has, by this time, terminated so that the other input thereto is a "0" and a "1" remains at the output of gate 120. Gate 120 waits until the next 42–48 pulse from counter 106, at which time both inputs to gate 120 are "1" and a "0" is applied to the R input of flip-flop 118. At this time, flip-flop 118 is reset, as shown at 161 in waveform *i*, whereby the "1" at the $\overline{Q}$ output thereof is applied to gate 122. Since all of the inputs to gate 122 are now "1," a "0" is generated at the output thereof, generating a "1" at the output of inverter 124, as shown at 162 in waveform *j*, signaling the end of dropout and permitting all future transitions of the data to pass through gate 105 to counter 106 and gate 128.

Figure 6:
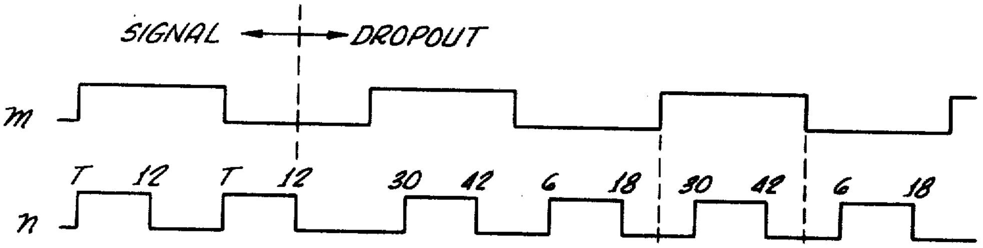
FIGS. 5 and 6 are a series of waveforms useful in explaining the operation of the system of FIG. 4.

Referring now to FIGS. 4, 5, and 6, an ideal double density data input is shown as waveform *m* in FIG. 6 and the corresponding data clock output before and during a dropout is shown as waveform *n* with the count of counter 106 indicated immediately thereabove. Counter 106 counts timing pulses on line 36, 24 timing pulses for each bit cell. Since, in double density, two bit cells may occur without a transition of the data, counter 106 may normally count up to 48, but by that time will be reset. Under normal circumstances, the 12-, 30-, and 42-counts are applied to flip-flop 129, together with the transitions of the data, and a data clock as shown in waveforms *k* and *n* is generated at the Q output thereof. It has been found most convenient to use transitions of the data and the 12-, 30-, and 42-counts during normal operation to generate a clock, the 42-count normally being applied to reset flip-flop 129. This is the normal method of synchronizing the phase of the data clock since a 42-count will only be reached in a sequence of 0–1–0, as shown in waveform *k* in FIG. 5. However, during a dropout, the 42-count cannot be used to reset flip-flop 129 or the phase of the clock prior to the dropout will not be preserved. This is because the 42-count will periodically be reached and there is no guarantee that such count represents a 0–1–0 pattern. Thus, during dropout, the 42-count is redirected via element 127 and OR gate 128 to the clock input of flip-flop 129.

In double density, the longest period which counter 106 should count in the presence of valid data is 48 timing pulses. If a longer period is sensed, due to a data dropout, it is preferred to use a different method of decoding and this is achieved by inhibiting the 12-count from passing to OR gate 128 and enabling the 6- and 18-counts for gate 182. This is shown in FIG. 6. The reason for changing the method of decoding is to insure a proper number of clock pulses at the end of dropout. In order words, if the normal 12-count were utilized, a valid transition might occur approximately at the time of a transition of flip-flop 129. Because of time base errors, the transition of the data might occur either slightly before or after the transition of flip-flop 129 and a single clock may be added or subtracted from the data clock. However, with the decoding logic shown in FIG. 6, the phase of the data clock is shifted by one-quarter of a bit period so that transitions of the data, in the absence of time base errors, always occur approximately halfway between transitions of the data clock. It will therefore be seen that the data may build up a time base error of ± ¼ bit period before reaching one of the transitions of the data clock. If the time base error is less than this, the proper number of pulses are automatically preserved at the end of dropout, as shown in waveform *k* in FIG. 5.

As stated previously, during normal decoding, the 42-count is used to reset flip-flop 129. This is the method of synchronizing the phase of the clock on a 0–1–0 input. However, during a dropout, the 42count cannot be used to reset flip-flop 129 or the phase of the clock prior to the dropout will not be preserved. Thus, upon the establishment of dropout, the output of inverter 124 is applied to switching circuit 127 whereby the decoding of counter 106 is changed so that the 42-count toggles flip-flop 129 instead of resetting it. This is shown in waveform *k* in FIG. 5.

In summary, the operation of system 100 is essentially the same as the operation of system 10. The double density data is passed through delay 102 and detected in detector 104 to generate pulses which, if passed through gate 105, will reset counter 106 and elements 125 and 126 and toggle flip-flop 129. Comparator 27 senses the amplitude of the signal from head 11 and defines a dropout region when the analog signal level drops approximately 26 dB below the nominal signal level. When this occurs, the comparator output switches from a "0" to a "1." A "1" at the output of comparator 27 operates to inhibit the detected transitions from resetting counter 106 and also, together with the output of transition detector 104, to set flip-flop 116. Setting of flip-flop 116 resets flip-flop 119 which prevents the data from passing through signal inhibit gate 101 to delay line 102.

At this time, counter 106 continues to circulate under the control of the timing pulses on line 36 from timing pulse generator 18. Thus, counter 106 continues to generate pulses on lines 110, 112, 113, and 114, which pulses are applied to flip-flop 129. Flip-flop 129, by changing state on the occurrence of each pulse, artificially generates a data clock which is equal in frequency and phase-shifted by ¼ bit period relative to the previously generated coherent data clock. Furthermore, since counter 106 had been reset by the last valid transition which passed through gate 105, there is phase synchronization between the double density data clock on line 130 and the data at the moment of dropout and the data reference clock is then used to insure that the reconstructed clock does not lose its phase relationship with the data transitions during the dropout period. Under these conditions then, the clock is considered assured as long as the time base error build up, contributed by all sources of transport and electronic components, does not exceed ± ¼ of a bit cell time interval.

When the analog signal level again returns to above the −26 dB level, the output of dual comparator 27 changes back to a "0." This resets flip-flop 116 and removes a first inhibiting input from gate 105. However, not until the termination of the next 42–48 pulse is flip-flop 119 set, permitting data to be applied to delay 102. At this time, an additional 1¾ bit periods are required before flip-flop 118 is reset to permit transitions from detector 104 from passing through gate 105. This is sufficient time so that any spurious transitions that may occur when the analog signal is emerging from the dropout region may be avoided.

While the gated, double density input data on line 103 may represent the transmitted data output of system 100, it would also be possible to convert the data to its NRZ format equivalent for transmission with the data clock on line 130. Thus, the outputs of counter 106 and flip-flop 129 as well as the transitions from gate 105 may be applied to a flip-flop to generate a data output in the NRZ format in the manner described in the before-mentioned U.S. Pat. No. 3,705,398.

It can therefore be seen that in accordance with the present invention, there is provided a digital data communication system which solves the problems discussed heretofore. The present digital data communication system eliminates the high inertia flywheel approach to the problem of the synchronization of digital data and permits full utilization of a digital system which responds instantaneously to the data on a bit by bit basis. With systems 10 and 100, the digital data, which is synchronized by a reference clock, is applied to a counter, transitions of the data being utilized to reset the counter whereby the outputs of the counter may be used to generate a coherent clock signal which is synchronized with the data on a bit by bit basis. The present system operate to sense a data dropout so that the transitions of the data which may now be spurious are inhibited from resetting the counter. The present systems operate to instantaneously begin generating artificial clock pulses during the duration of the dropout period so that data dropouts do not alter the number of clock pulses between synchronizing signals of the data. Furthermore, at the termination of the dropout period, the present systems delay application of the data transitions to the counter for at least one bit period of the data to prevent spurious transitions of the data from generating unwanted clock signals.

While the invention has been described with respect to the preferred physical embodiments constructed in accordance therewith, it will be apparent to those skilled in the art that various modifications and improvements may be made without departing from the scope and spirit of the invention. For example, while the present invention has been described as applied to input data which is phase-encoded in accordance with a bi-phase format and a double density format, it will be obvious to those skilled in the art that the principles of the present invention are equally applicable to any format in which the input data is encoded. Accordingly, it is to be understood that the invention is not to be limited by the specific illustrative embodiments, but only by the scope of the appended claims.

We claim:

1. In a digital data communication system wherein digital data is utilized to generate a coherent clock signal for said data, the improvement comprising:

means responsive to said data for generating a data dropout signal when the amplitude level of said data falls below a predetermined threshold level;

means responsive to said dropout signal for inhibiting generation of said coherent clock signal; and means responsive to said dropout signal for generating an artificial clock signal during the duration of said dropout signal.

2. In a digital data communication system according to claim 1, the improvement further comprising:

a recirculating counter, the output of said counter being used to generate said coherent clock signal, transitions of said digital data being utilized to reset said counter; and wherein said inhibiting means is operative to inhibit said transitions of said data from resetting said counter.

3. In a digital data communication system according to claim 2, the improvement wherein the output of said counter is used to generate said artificial clock signal, said counter continuing to circulate, during the duration of said dropout signal.

4. In a digital data communication system according to claim 3 wherein said digital data is synchronized by a reference clock, the improvement further comprising:

a source of timing pulses, said timing pulses being applied to said recirculating counter for clocking the same; and means for phase locking said timing pulses to said reference clock whereby said artificial clock signal is related to the desired period of said data.

5. In a digital data communication system according to claim 3, wherein said digital data is synchronized by a reference clock, the improvement wherein said recirculating counter is driven by timing pulses, the frequency of which is a fixed multiple of the frequency of said reference clock.

6. In a digital data communication system according to claim 3, the improvement further comprising:

means responsive to termination of said dropout signal for delaying application of said data transitions to said recirculating counter for at least one bit period of said digital data.

7. In a digital data communication system according to claim 1, the improvement wherein said inhibiting means is responsive to termination of said dropout signal for permitting generation of said coherent clock signal, and further comprising:

means responsive to termination of said dropout signal for delaying generation of said coherent clock signal for a time sufficient to allow spurious transitions of said data to be avoided.

8. In a digital data communication system according to claim 7, the improvement wherein said delay is at least one bit period of said digital data.

9. In a digital data communication system according to claim 1, the improvement further comprising:

delay means interposed in the path of said digital data, said delay being approximately one-quarter of the period of the highest frequency of said digital data, said delay means being interposed between said digital data and said inhibiting means.

10. In a digital data communication system according to claim 1, the improvement wherein said data dropout signal generating means comprises:

a comparator having positive and negative reference levels, said comparator being responsive to said data for generating said data dropout signal whenever the amplitude level of said data lies between said positive and negative reference levels.

11. In a digital data communication system wherein digital data, synchronized by a reference clock, is applied to a counter, transitions of said digital data being utilized to reset said counter, selected counts from said counter being used to generate a coherent clock signal for said data, the improvement wherein said counter is a recirculating counter and comprising:

means responsive to said data for generating a data dropout signal when the amplitude level of said data falls below a predetermined threshold level; and means responsive to said dropout signal for inhibiting said transitions of said data from resetting said counter whereby said counter continues to circulate, the counts from which are used to generate an artificial clock signal during the duration of said dropout signal.

12. In a digital data communication system according to claim 11, the improvement further comprising:

delay means interposed in the path between said digital data and said inhibiting means, said delay means delaying said data by approximately one-quarter of the period of the highest frequency of said data.

13. In a digital data communication system according to claim 12, the improvement wherein said data dropout signal generating means is also responsive to an output of said counter.

14. In a digital data communication system according to claim 12, the improvement wherein said data dropout signal generating means is also responsive to the delayed digital data from said delay means.

15. In a digital data communication system according to claim 11, the improvement wherein said inhibiting means is responsive to termination of said dropout signal for permitting said transitions of said data from resetting said counter, and further comprising:

means responsive to termination of said dropout signal for inhibiting said transitions of said data from resetting said counter for a time sufficient to allow spurious transitions of said data to be avoided.

16. In a digital data communication system according to claim 15 wherein said time is at least one bit period of said digital data.

17. In a digital data communication system according to claim 11, the improvement further comprising:

a source of timing pulses, said timing pulses being applied to said recirculating counter for clocking the same; and means for phase locking said timing pulses to said reference clock whereby said artificial clock signal is related to the desired period of said data.

18. In a digital data communication system according to claim 17, the improvement wherein the frequency of said timing pulses is a fixed multiple of the frequency of said reference clock.

19. In a digital data communication system according to claim 11, the improvement wherein said data dropout signal generating means comprises:

a comparator having positive and negative reference levels, said digital data being applied to said comparator, said comparator generating said data dropout signal whenever the amplitude level of said data lies between said positive and negative reference levels.

20. A digital data communication system responsive to input data, in analog form, synchronized by a reference clock comprising:

delay means responsive to said data for delaying said data by approximately one-quarter of the period of the highest frequency of said data;

detector means responsive to the output of said delay means for generating a pulse for each leading and trailing edge transition of said delayed data;

a recirculating counter having a reset input and a timing pulse input;

first gate means interposed between the output of said detector means and said reset input of said counter, said transition pulses being utilized to reset said counter;

means responsive to said data reference clock for generating a plurality of coherent timing pulses, said timing pulses being applied to said timing pulse input of said counter for clocking the same;

means responsive to at least one selected count output of said counter for generating a coherent clock signal for said data; and means responsive to said data for generating a data dropout signal when the amplitude level of said data falls below a predetermined reference level, said data dropout signal being applied to said first gate means for inhibiting said transitions of said data from resetting said counter, whereby said counter continues to circulate, under the control of said timing pulses, at least one selected count output of said counter being used to generate an artificial clock signal during the duration of said dropout signal.

21. A digital data communication system according to claim 20 further comprising:

second gate means interposed between said input data and said delay means; and dropout detector means responsive to said data dropout signal for generating a first inhibiting signal, said first inhibiting signal being applied to said first and second gate means, said second gate means inhibiting said data from being applied to said delay means.

22. A digital data communication system according to claim 21 wherein said data dropout signal generating means is responsive to the amplitude level of said data rising above said predetermined reference level for terminating said data dropout signal, said dropout detector means being responsive to termination of said dropout signal for removing said first inhibiting signal from said first and second gate means, and further comprising:

means responsive to termination of said first inhibiting signal for generating a second inhibiting signal, said second inhibiting signal having a time period sufficient to allow spurious transitions of said data to be avoided, said second inhibiting signal being applied to said first gate means for inhibiting said transitions of said data from resetting said counter for said time period.

23. A digital data communication system according to claim 22 wherein said second inhibiting signal generating means is further responsive to at least one selected count output of said counter, said second inhibiting signal generating means utilizing said selected count output of said counter for establishing said time period.

24. A digital data communication system according to claim 21 wherein said dropout detector means is also responsive to at least one selected count output of said counter.

25. A digital data communication system according to claim 21 wherein said dropout detector means is also responsive to said output of said transition detector means.

26. A digital data communication system according to claim 20 wherein said input data is phase-encoded in accordance with a bi-phase format and wherein said selected count output of said counter which is utilized for generating both said coherent clock signal and said artificial clock signal represents more than one-half of a bit period but less than one full bit period of said data.

27. A digital data communication system according to claim 26 wherein said selected count represents three-quarters of a bit period of said data.

28. A digital data communication system according to claim 26 further comprising:

means responsive to the output of said first gate means and said selected count output of said counter for generating and applying to said first gate means an inhibiting pulse for inhibiting selected transition pulses from passing through said firsr gate means, said inhibiting pulse beginning when a transition passes through said first gate means and ending upon the occurrence of the next selected count output of said counter.

29. A digital data communication system according to claim 20 wherein said input data is phase-encoded in accordance with a double density format and wherein said coherent clock signal generating means is responsive to three selected count outputs of said counter and to said transition pulses.

30. A digital data communication system according to claim 29 further comprising:

means responsive to four selected count outputs of said counter during said dropout signal for generating said artificial clock signal, at least some of said selected count outputs being different from the selected count outputs utilized by said coherent clock signal generating means whereby the phase of said artificial clock signal is shifted by one-quarter of a bit period from the phase of said coherent clock signal.

31. A digital data communication system according to claim 20 wherein said input data is phase-encoded in accordance with a bi-phase format and wherein said delay means delays said data by one-quarter of a bit period of said data.

32. A digital data communication system according to claim 20 wherein said input data is phase-encoded in accordance with a double density format and wherein said delay means delays said data by one-half of a bit period of said data.

* * * * *